United States Patent

Hopkins

(12) United States Patent
(10) Patent No.: US 10,815,975 B1
(45) Date of Patent: Oct. 27, 2020

(54) HEAVY WATER OCEAN THERMAL ENERGY CONVERSION METHOD AND SYSTEM

(71) Applicant: Lester Reid Hopkins, Virginia Beach, VA (US)

(72) Inventor: Lester Reid Hopkins, Virginia Beach, VA (US)

(*) Notice: Subject to any disclaimer, the term of this patent is extended or adjusted under 35 U.S.C. 154(b) by 13 days.

(21) Appl. No.: 16/266,701

(22) Filed: Feb. 4, 2019

Related U.S. Application Data

(60) Provisional application No. 62/639,016, filed on Mar. 6, 2018.

(51) Int. Cl.
    *F03G 7/05* (2006.01)
    *B63G 8/22* (2006.01)
    *B63G 8/00* (2006.01)

(52) U.S. Cl.
    CPC ............ *F03G 7/05* (2013.01); *B63G 8/22* (2013.01); *B63G 2008/002* (2013.01); *Y02E 10/34* (2013.01)

(58) Field of Classification Search
    CPC .................................. F03G 7/05; Y02E 10/34
    USPC ............................................... 60/641.7
    See application file for complete search history.

(56) References Cited

U.S. PATENT DOCUMENTS

| | | | | |
|---|---|---|---|---|
| 4,104,883 A | * | 8/1978 | Naef | F01K 9/00 165/104.13 |
| 4,333,312 A | * | 6/1982 | Sorensen | F03G 7/05 60/641.7 |
| 5,246,061 A | * | 9/1993 | Zalite | B64G 1/50 165/10 |
| 2008/0140166 A1 | * | 6/2008 | von Hoffman | A61F 7/02 607/108 |
| 2008/0314043 A1 | * | 12/2008 | Howard | F03G 7/05 60/641.7 |

FOREIGN PATENT DOCUMENTS

JP 55098607 A * 7/1980

* cited by examiner

*Primary Examiner* — Laert Dounis
(74) *Attorney, Agent, or Firm* — Peter J. Van Bergen

(57) ABSTRACT

An OTEC system and method utilize rigid containers, each of which defines a sealed volume partially filled with heavy water. A vessel houses the rigid containers and is disposed in ocean water. The vessel transports the rigid containers between a surface of the ocean water and a depth D of the ocean water at which the heavy water freezes to become frozen heavy water. An OTEC plant located at the surface of the ocean water melts the frozen heavy water in a condensing process.

12 Claims, 3 Drawing Sheets

HEAVY WATER OCEAN THERMAL ENERGY CONVERSION METHOD AND SYSTEM

Pursuant to 35 U.S.C. § 119, the benefit of priority from provisional application 62/639,016, with a filing date of Mar. 6, 2018, is claimed for this non-provisional application.

FIELD OF THE INVENTION

The invention relates generally to ocean thermal energy conversion, and more particularly to methods and systems using heavy water in ocean thermal energy conversion.

BACKGROUND OF THE INVENTION

Ocean Thermal Energy Conversion (OTEC) has been a promising source of clean energy for several decades. Briefly, an OTEC system is a heat engine that uses cold ocean water (pumped from depths of approximately 1000 meters where temperatures are 4-5° C.) as a cold pool, and warm ocean-surface water as a warm pool at a temperature of 20-30° C. While the small temperature difference between the cold and warm pools defines OTEC as a low-efficiency heat engine, the source for both pools is free and abundant. Thus, OTEC has enormous potential to be an energy source for the world.

Unfortunately, a number of technical and economic challenges must be overcome before OTEC's potential can be realized. For example, one of the greatest challenges in OTEC is how to bring the cold water from deep ocean depths to the ocean surface in sufficient quantity to support a typical OTEC plant geared toward a 100-megawatt capacity. To support this energy capacity where ocean-surface temperatures are 25° C., the physics of the thermodynamic process requires approximately 366 cubic meters per second of cold water. To support this thermodynamic process, a cold water pipe extending 1000 meters below the ocean surface would have to be 10 meters in diameter. The engineering issues, construction issues, cost, and maintenance issues associated with such a pipe are too great to overcome, thereby preventing the potential of OTEC from being realized.

SUMMARY OF THE INVENTION

Accordingly, it is an object of the present invention to provide methods and systems for use in producible and efficient Ocean Thermal Energy Conversion (OTEC) systems.

Other objects and advantages of the present invention will become more obvious hereinafter in the specification and drawings.

In accordance with the present invention, an Ocean Thermal Energy Conversion (OTEC) system and method utilize a plurality of rigid containers. Each of the rigid containers defines a sealed volume partially filled with heavy water. A vessel houses the rigid containers and is disposed in ocean water. The vessel transports the rigid containers between a surface of the ocean water and a depth D of the ocean water at which the heavy water freezes to become frozen heavy water. An OTEC plant located at the surface of the ocean water melts the frozen heavy water in a condensing process.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
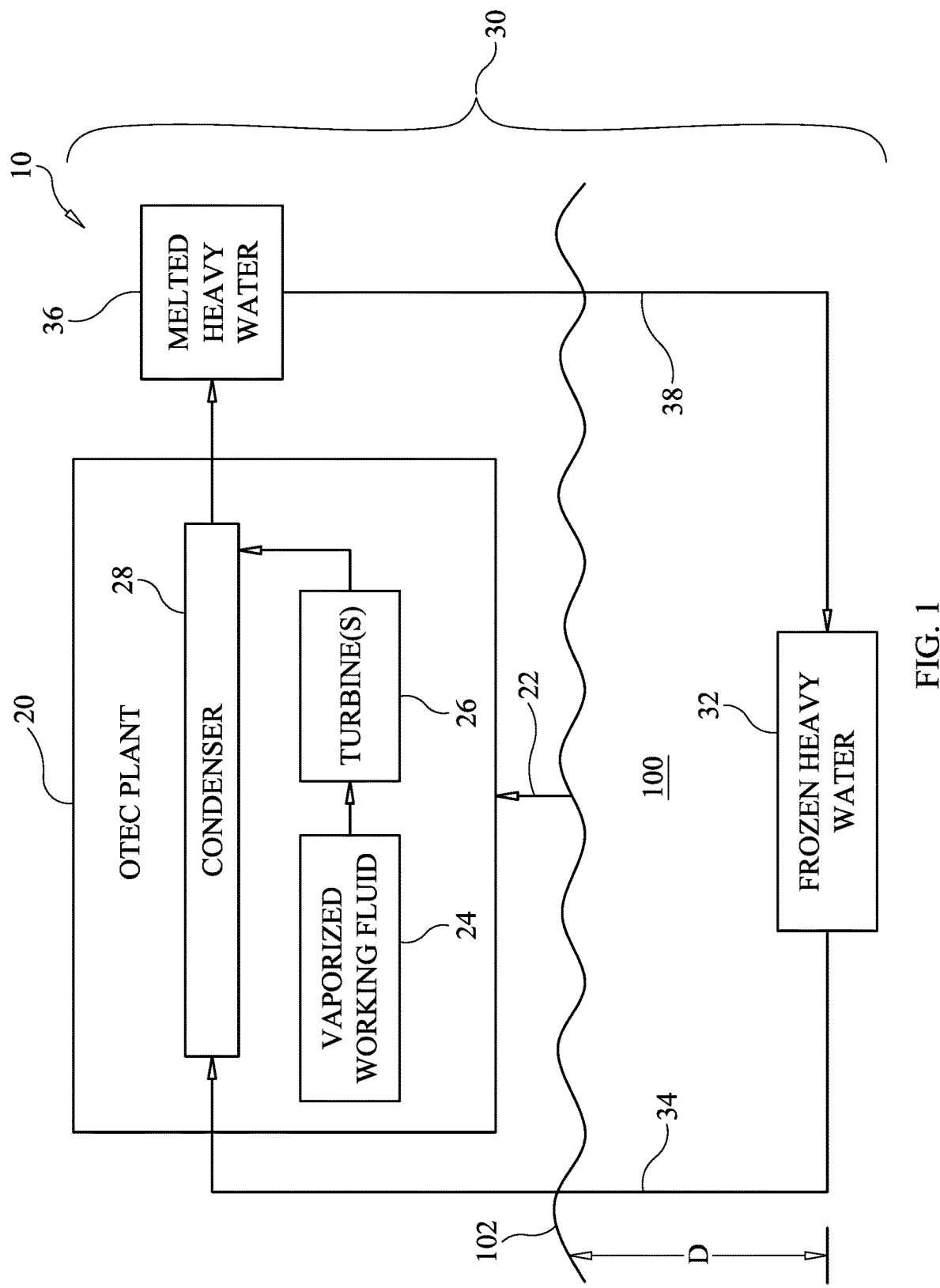
FIG. 1 is a schematic view of an Ocean Thermal Energy Conversion (OTEC) system using heavy water in accordance with the present invention.

Referring now to the drawings and more particularly to FIG. 1, an Ocean Thermal Energy Conversion (OTEC) system using heavy water is illustrated and is referenced generally by numeral 10. As is well-known in the art, heavy water (also known as deuterium oxide or $D_2O$) has the same structure as water except that the hydrogen is called deuterium. Standard hydrogen has one proton in its nucleus such that its relative molecular weight is 1. Deuterium has one proton and one neutron in its nucleus such that its relative molecular weight is 2. The present invention exploits the attributes of heavy water in a variety of methods and systems to provide an OTEC system that does not need to pump large quantities of cold ocean water to the ocean's surface.

Deuterium is a naturally occurring isotope of hydrogen that, when combined with oxygen, forms deuterium oxide or heavy water as it will be referred to hereinafter. As mentioned above, heavy water is similar to, but denser and heavier than, normal water. In addition, heavy water is denser than normal water, and has slightly higher values of specific heat, heat of fusion (by volume), and freezing temperature (i.e., 3.82° C.).

The volume of frozen heavy water needed for an OTEC system is drastically lower (estimated to be 40 to 50 times lower) than the volume required by an OTEC system that is reliant on the use of cold ocean water brought to the warmer ocean surface. Several factors are listed below that contribute to the lower volume requirement.

The cooling potential of frozen heavy water (or heavy water ice) is nearly 90 times that of salt water (i.e., 350 joules/cc for heavy water versus 3.9 joules/cc for salt water). Therefore, the volume of frozen heavy water required for OTEC operations is significantly less compared to the volume of cold water required by conventional OTEC designs. A number of additional factors increase the relative volume advantage of frozen heavy water as follows:

A greater efficiency is achieved with lower parasitic energy costs due to much smaller volumes of ice that must be transported as compared to cold water. The improved efficiency lowers the gross output requirement of an OTEC system's water-surface-located OTEC plant for a desired equivalent net output.

Frozen heavy water (e.g., frozen at ocean depths of 1200 meters or greater) is colder than cold ocean water pumped from depths of 1000 meters. Each degree Centigrade (C) of coldness translates to roughly 13% increase in net output, and accordingly, a lower volume of frozen heavy water can be used to yield a given net output.

Frozen heavy water maintains near constant temperature in a water-surface-located OTEC plant's condenser until completely melted. In contrast, the water temperature from an OTEC system's cold water pipe increases in the OTEC plant's condenser because 3-4° C. are used by the heat engine for cooling. The mean temperature of frozen heavy water is constant because the temperature thereof does not change during the melting phase. The resulting 1.5-2° C. temperature advantage of frozen heavy water in the OTEC plant's condenser translates to additional 15% to 20% higher output thereby further reducing the volume requirement of frozen heavy water.

The current costs of heavy water are very high as cost estimates for 1 kilogram of 90% pure heavy water run about $300, or roughly $300,000 per ton. Assuming a 100 megawatt OTEC plant would require roughly 26,000 tons/hour of heavy water to match 366 cubic meters per second of cold water modeled by current OTEC designs, the cost of a heavy water OTEC system to include its water-surface-located OTEC plant would be roughly $8 billion dollars. However, the present invention enables heavy water to be cycled as much as 10 times per hour, so that the actual volume requirement would only be approximately 2,600 tons, thereby reducing heavy water material costs to roughly $800 million. Further, the future of heavy water production is bright based on a recently-announced discovery from the United Kingdom's University of Manchester. Briefly, it was found that a graphene filter could be used to separate the hydrogen isotopes in normal water to produce heavy water. This discovery will potentially reduce the cost of heavy water by a factor of 100 that, in turn, would reduce the material cost of a heavy water-based OTEC system to $8 million for the above-described 100 megawatt model. These projected costs compare very favorably with the costs of the cold water pipe and supporting pumping systems used in current OTEC design models. Accordingly, the present invention proposes methods and systems to replace the large volume of cold water with frozen heavy or semi-heavy water (i.e., a diluted mixture of normal water and heavy water with properties in-between the two pure forms depending on the relative concentrations). Heavy water freezes at 3.82° C. With ocean water temperatures at depths below approximately 1200 meters being lower than 3.82° C., it is feasible to use ocean water to freeze heavy water.

Referring again to FIG. 1, OTEC system 10 is a closed loop system that includes an OTEC plant 20 located at or above the surface 102 of ocean water 100, and a heavy water transport 30. In general, heavy water transport 30 supports the transport of heavy water between surface 102 and a depth D in ocean water 100 below surface 102 sufficient to provide for freezing of the heavy water to thereby yield frozen heavy water 32. Depth D will generally be approximately 1200 meters or more. Frozen heavy water 32 follows or traverses an ascent path 34 and is provided to OTEC plant 20 where frozen heavy water 32 is melted as it is used by the plant's condenser to condense the OTEC plant's vaporized working fluid to a liquid state thereof. The process by which electricity is generated by the OTEC plant's heat engine is well-understood in the art.

There are two basic designs for OTEC plants, open cycle and closed cycle. In either case, frozen heavy water 32 functions as the coolant in the plant's heat engine such that frozen heavy water 32 melts within the plant's condenser as the vaporized working fluid is cooled/condensed. Prior to the cooling/condensing of the vaporized working fluid, the movement of the vaporized working fluid is used to drive a turbine(s) in OTEC plant 20 to generate electric energy as would be understood in the art. In general, it is to be understood that a variety of known designs for OTEC plant 20 could be used without departing from the scope of the present invention. Thus, only the general operational aspects of OTEC plant 20 will be described herein, whereas the structural details of OTEC plant 20 are not to be considered limitations of the present invention.

In general, an open cycle OTEC plant receives ocean water 100 from surface 102 as indicated by arrow 22. Ocean water 100 at surface 102 serves as the plant's working fluid as it is flash evaporated at the OTEC plant's evaporator (not shown) to form a vaporized working fluid 24 in a low pressure container in OTEC plant 20. The vapor is passed through a turbine(s) 26 causing it to spin to generate electricity. The vapor is then brought into direct contact with the OTEC plant's condenser 28 that is supplied with frozen heavy water 32 thereby causing the vapor to cool/condense. The condensed, desalinated water is then either dumped back in the ocean as waste, or made available for other uses not directly related to the OTEC process.

In general, a closed cycle OTEC plant uses a different working fluid, such as ammonia or FREON, to drive the plant's turbine. Ocean water 100 from surface 102 is provided to OTEC plant 20 as indicated by arrow 22. The warm seawater and working fluid both pass through the OTEC plant's evaporator (not shown), where the heat from the seawater is absorbed by the working fluid causing it to evaporate to generate vaporized working fluid 24. The resultant vaporized working fluid 24 passes through turbine (s) 26 to generate electricity. Vaporized working fluid 24 then enters condenser 28 containing frozen heavy water 32, where the working fluid condenses to a liquid state thereof. The working fluid is then recycled to the OTEC plant's evaporator and the cycle repeated.

Regardless of the design of OTEC plant 20, the processing carried out in OTEC plant 20 causes frozen heavy water 32 to melt and become melted heavy water 36 at surface 102. Heavy water transport 30 then causes melted heavy water 36 to follow or traverse a descent path 38 back to depth D where melted heavy water 36 is converted once again to frozen heavy water 32 so that the cycle can be repeated.

Figure 2:
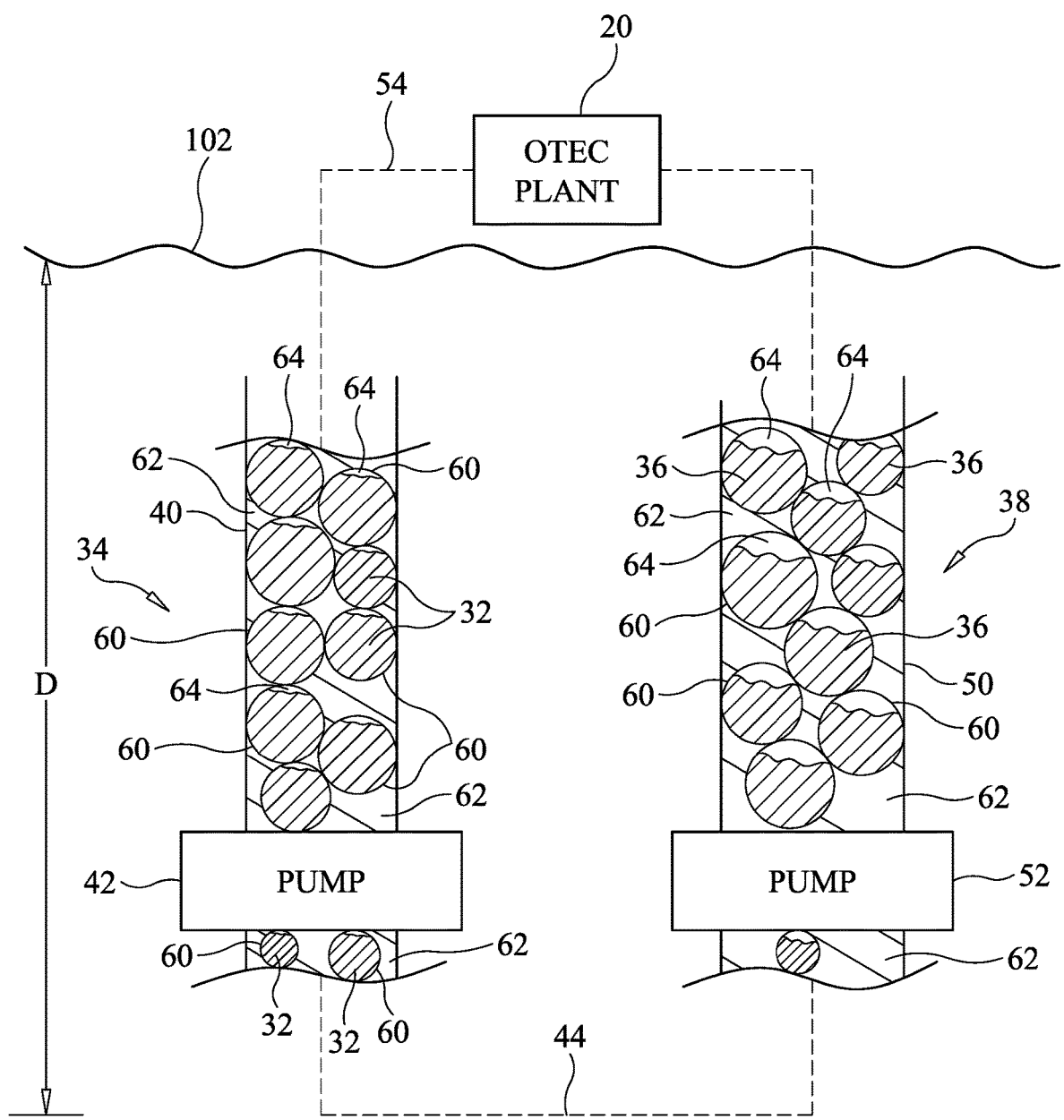
FIG. 2 is a cross-sectional view of a portion of a pipe-based heavy water transport in accordance with an embodiment of the present invention.

A variety of heavy water transport methods/systems could be used without departing from the scope of the present invention. Several non-limiting examples will be discussed below. Referring first to FIG. 2, a fixed and sealed heavy water transport vessel includes an ascending transport pipe 40 to define ascent path 34 and a descending transport pipe 50 to define descent path 38. Pipes 40 and 50 are joined at depth D and OTEC plant 20 (as indicated by dashed lines 44 and 54, respectively) to define a closed loop traversing between and through the above-described ocean depth D and OTEC plant 20. Pipe 40 is insulated to keep the frozen heavy water from melting on its ascent to the ocean's surface. The functions of pipes 40 and 50 can be realized using a single or multiple pipes without departing form the scope of the present invention.

In order to pump frozen heavy water through pipe 40, the frozen heavy water 32 is packaged in small, sealed-volume, hollow and spherical beads 60 having generally rigid, non-flexible shells that can withstand the pressure of the deep ocean. Beads 60, which can be the same or different sizes, are dispersed in a liquid 62 such as fresh water to form a slurry mixture. However, since pipes 40 and 50 are closed to the seawater, any liquid that will not freeze and maintain its liquid state at the heavy water freezing depth D can be used in the slurry mixture. The ratio of beads 60 to liquid 62 in the slurry depends largely on the size and density of the beads. Suitable materials for beads 60 include aluminum, steel, and other strong metals, as well as certain plastics and glass fiber polymers with sufficient strength to withstand encountered pressures. One or more pumps (e.g., pumps 42 and 52) can be provided to keep the slurry in pipes 40 and 50 moving at a specified rate/volume.

The rate of freezing of the heavy water and speed at which the slurry (i.e., the combination of beads 60 and liquid 62) is pumped determines the overall volume of frozen heavy water that is needed. For example, if each bead 60 circulates twice per hour, then the volume needed is halved. Pipes 40 and 50 define a closed loop passing through OTEC pant 20 and from/to depth D. Therefore, liquid 62 can be fresh water, water mixed with other ingredients, or other non-freezing liquids because there is no direct contact with the seawater. Further, additives such as chlorine can be used to prevent fouling without any environmental impact.

Beads 60 (to include their contents) are designed to have neutral or near neutral buoyancy in liquid 62 at all operating depths. The density of liquid 62 will increase with depth, but the density of beads 60 is nearly constant. For this reason, the buoyancy of beads 60 may decrease somewhat at deeper depths. In cases where the buoyancy of beads 60 negatively impacts system operation, it may be desirable for the beads to exhibit a minor amount of compression at deeper depths resulting in a small increase in bead density that contributes to the maintenance of neutral or near neutral buoyancy.

Beads 60 contain heavy water and enough compressible material to allow the heavy water to expand within the bead as it freezes. The bead shell must withstand the exterior pressure of the ocean depths at the furthest depth D of pipes 40 and 50. The bead shell must also withstand the interior pressure exerted by the contained compressible material (e.g., air) that will be pressurized internally by the expanded frozen heavy water. The pressure within a bead 60 is determined by the properties and mass of the compressible material in the bead. For example, the compressible material can be air pockets 64 in beads 60 since the air can be compressed without creating unduly high internal pressure after the freezing and expansion of the heavy water. Accordingly and as illustrated in FIG. 2, the volume occupied by an air pocket 64 is less when frozen heavy water 32 is in a bead 60 (i.e., along ascent path 34) than when melted heavy water 36 is in a bead 60 (i.e., along descent path 38). The air (or other compressible material) can occupy free space in bead 60, or could be contained in tiny sacs (not shown) within bead 60 without departing from the scope of the present invention.

The heavy water cannot be exposed to ambient pressure at depth D because the pressure of the deep ocean lowers heavy water's freezing temperature below the temperature of the cold seawater such that it will not freeze. For this reason, the heavy water needs to be protected by a rigid-shell bead 60 to maintain a low internal pressure and maintain a freezing point above the temperature of the ambient ocean. The internal pressure can be above sea level pressure but generally below ambient. Since smaller diameter beads provide a greater surface area than a smaller number of larger diameter beads containing equivalent volumes of heavy water, bead size can be selected to control rates of freezing and melting.

Another heavy water transport solution made possible by the volume reduction provided by the use of frozen heavy water in OTEC system 10 relies on one or more movable vessels such as unmanned underwater vehicles (UUVs) to transport frozen heavy water 32 along ascent path 34 to OTEC plant 20 and to transport melted heavy water 36 from OTEC plant 20 along descent path 38 to depth D. That is, the movable vessel traverses a closed loop analogous to the closed loop traversed by the above-described fixed vessel transport. Thus, the movable vessel approach replaces the above-described fixed vessel provided by pipes 40 and 50.

Figure 3:
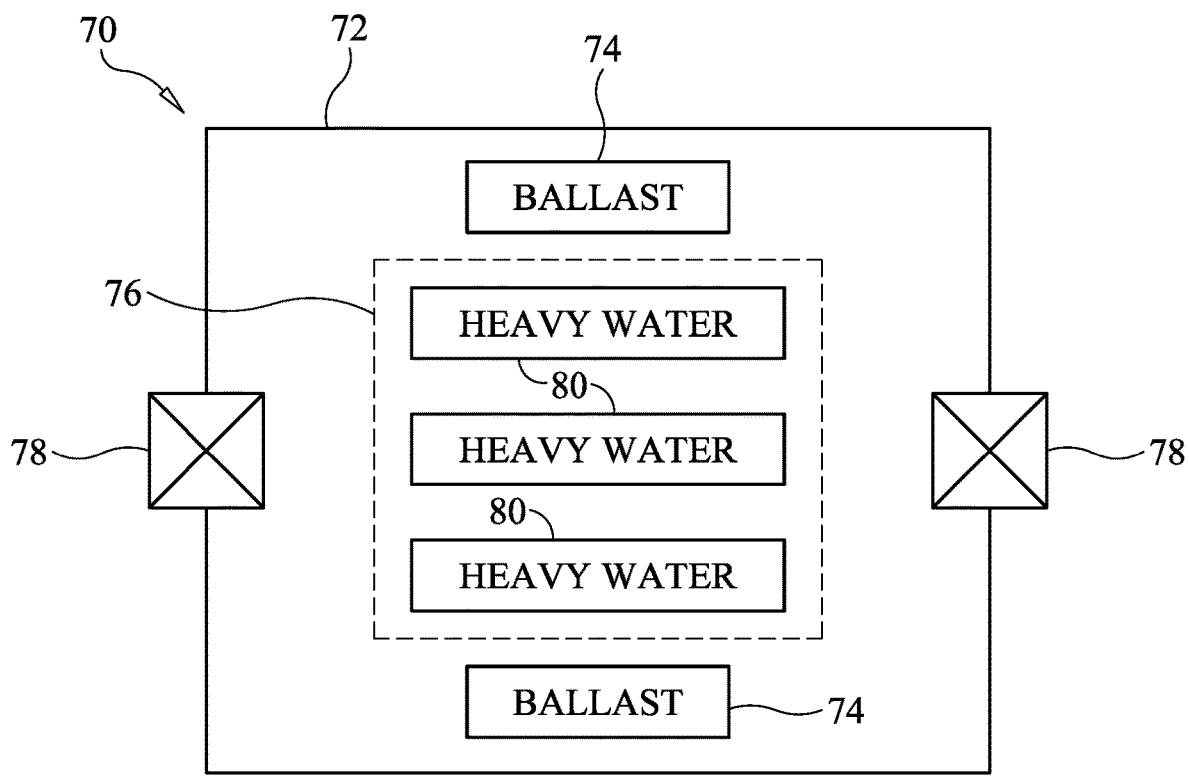
FIG. 3 is a schematic view of an unmanned underwater vehicle-based heavy water transport in accordance with another embodiment of the present invention.

Each such movable vessel can have the basic attributes illustrated in FIG. 3. More specifically, a UUV 70 has a pressure and temperature-insulating hull 72, ballast units 74, a heavy water-based heat exchanger 76, and valves 78 that control the ingress/egress of the ocean water through vessel 70 such that a heat exchange can take place between the ocean water and heat exchanger 76. As would be well-understood in the art, manipulation of ballast or other means can provide necessary propulsion for near-vertical descent and ascent. In addition, UUV 70 would generally be equipped with well-known control mechanisms (not shown for clarity of illustration) that would allow UUV 70 to travel between an ocean's surface and the above-described depth D at which heavy water will freeze. Heat exchanger 76 is defined by a number of spaced apart, sealed-volume, rigid hollow plates 80, each of which seals therein a quantity of heavy water (e.g., in its pure form, a diluted semi-heavy water mixture, an immiscible mixture that includes heavy water, in the form of a slurry of beads/liquid, etc.) that will allow the heavy water to freeze and then melt during the above-described transport cycle.

Figure 4:
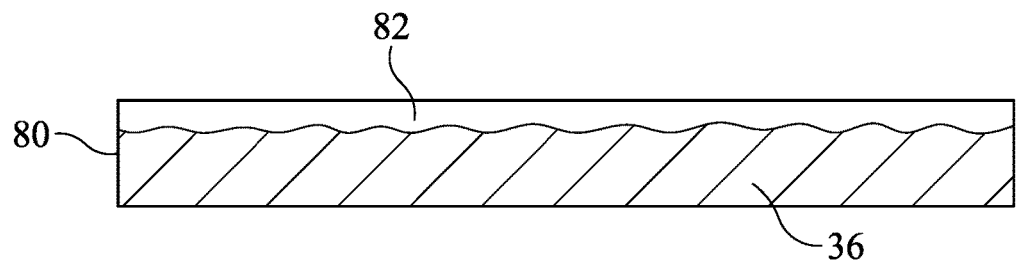
FIG. 4 is an isolated cross-sectional view of a single heat exchanger plate with a bulk supply of heavy water sealed therein in accordance with an embodiment of the present invention.

By way of example, FIG. 4 illustrates a cross-sectional view of a hollow and rigid plate 80 that defines a sealed volume for housing a bulk quantity of melted heavy water 36. To allow for expansion upon freezing of melted heavy water 36, a volume of air 82 can also be defined in plate 80. For good thermal conductivity, plate 80 is generally made from materials such as aluminum or steel, although certain plastics and glass fiber polymers with sufficient strength could also be used without departing from the scope of the present invention. For added structural support and/or thermal conductivity enhancement, thermally-conductive trusses, fins, etc. (not shown) can be included in the interior sealed volume of plate 80.

Figure 5:
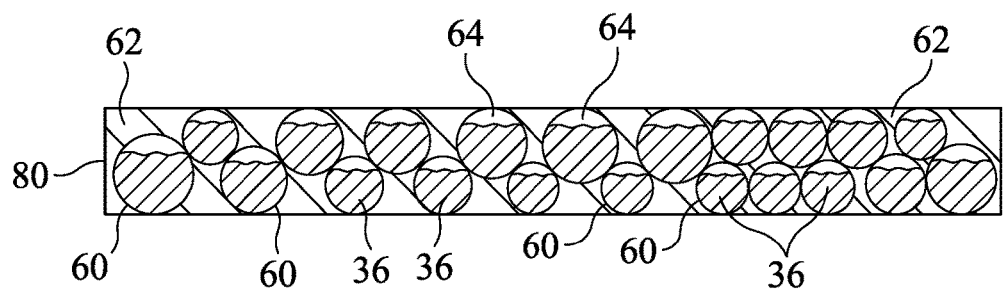
FIG. 5 is an isolated cross-sectional view of a single heat exchanger plate with a slurry of heavy water-filled beads sealed therein in accordance with another embodiment of the present invention.

Another embodiment of a heat exchanger plate 80 is illustrated in FIG. 5 where each heat exchanger plate 80 defines a sealed volume that is filled with a slurry of the above-described beads 60 and liquid 62. Air pockets 64 within each bead 60 can be provided to allow for expansion of melted heavy water 36 when it freezes as described above. When contained in heat exchanger plate 80, the beads do not need strong shells because plate 80 can be constructed to shield its contents from the ocean pressure. In such cases, rubber, latex or other flexible materials can be used for the beads. In either of the above-described designs or other plate designs, the number and size of plates 80 in a heat exchanger 76 can be adapted to the needs of a particular application without departing from the scope of the present invention.

In another embodiment, the heavy water could be mixed with oil or other immiscible liquid to thereby eliminate containment of the heavy water in beads. In this embodiment, the near constant motion of the heavy water and oil slurry (during descent and ascent through the ocean water) will prevent significant separation of the heavy water and oil, allowing it to behave as slurry in both unfrozen and frozen states.

When using UUV 70, the method of the present invention proceeds as follows:

1. UUV 70 carrying a load of melted heavy water 36 resides at the OTEC plant's platform, or floats on the ocean's surface with positive buoyancy.
2. UUV 70 fills its ballast 74 to create negative buoyancy.
3. UUV 70 descends to the above-described depth D. UUV 70 slows its descent by partially blowing ballast 74 and/or changing motion from a vertical descent to a wide circular glide pattern as would be understood in the art.
4. At depth D, valves 78 are opened to admit the cold ocean water to flow through heat exchanger 76 for a period of time sufficient for all the melted heavy water 36 to freeze and become frozen heavy water 32. At this point, valves 78 are closed.
5. UUV 70 blows its remaining ballast 74 to achieve positive buoyancy and rises to the ocean surface.
6. UUV 70 arrives at the ocean surface to be processed by the OTEC plant after which the cycle is repeated.

The UUV's hull does not admit significant volumes of surrounding water during descent or ascent. The hull does not need to withstand large pressure differentials, as the interior pressure equals the ambient pressure. The UUV's hull remains closed, especially on ascent, to keep the frozen heavy water inside apart from the surrounding water, which steadily increases in temperature during ascent to the surface. The closed hull insulates the frozen heavy water and prevents it from melting prior to reaching the ocean surface. The cold seawater trapped within UUV 70 when valves 78 are closed (at depth D) also has an insulating effect.

Admission of the ambient cold ocean water used to freeze the melted heavy water at depth D can be accomplished using valves 78 or other methods without departing from the scope of the present invention. Freezing occurs quickly even with a small temperature difference between the cold water and the freezing point of the heavy water for the following reasons:

The seawater, the heavy water inside the heat exchanger's plates, and the plate material (such as aluminum) are good conductors of heat to enable heat transfer from the heavy water to the cold ocean water.

High surface-area to volume ratio of the heat exchanger plates supports high rates of heat exchange between the heavy water and the cold ocean water.

Movement of the UUV through the water, and water through the UUV interior and around the heat exchanger plates, further creates a high heat transfer coefficient that supports a high heat exchange rate.

Design features of the UUV, the heat exchanger plates, and UUV operation can increase convection of heavy water to increase heat transfer. For example, rotating motion of the UUV will create movement of melted heavy water in the plates to improve heat convection. The heat exchanger plates are partially filled with air to allow expansion of the ice as it freezes. Further, the air space allows for sloshing and mixing of the heavy water for increased convection. Still further, balls or other agitators can be provided in the plates for random movement therein as the vessel rotates to further increase heavy water mixing and the resultant convection.

The UUV described herein can service multiple OTEC plants or platforms to provide flexibility in allocating individual UUVs to different plants/platforms. This flexibility permits certain specializations of both UUVs and plants/platforms. For example, one OTEC platform can specialize in maintenance of the UUVs, or a specific aspect of UUV maintenance, and each UUV can be rotated in over time. Other platforms can specialize in other aspects of equipment maintenance so that a maintenance facility could be distributed across multiple platforms. Other types of specialization afforded by the UUVs are also possible.

On surfacing with frozen cargo, the UUV can be admitted to an OTEC plant's condenser bay which can be located below the waterline. Valves 76 are opened, and the vapor that drives the turbines, that is generated in the OTEC heat engine from the warm surface water, is admitted into the UUV after passing through the turbines. The vapor then cools and condenses thereby releasing heat to the frozen heavy water. After the cargo of frozen heavy water has melted, the UUV is removed from the bay and the next UUV is processed in the same manner. Multiple bays can be used in coordination to provide constant operation of the heat engine. Combining the UUV and condenser into a multi-purpose unit represents potential cost savings for construction of the OTEC system.

In another embodiment, the frozen heavy water slurry is pumped from the vessel into the OTEC plant and replaced with liquid heavy water slurry that is in the plant from the previous cycle. While the pumped heavy water ice slurry is processed in the plant's condenser, the UUV can depart immediately after loading the liquid heavy water slurry without waiting for melting to complete thereby decreasing overall cycle time and allowing more efficient use of the heavy water resource. In addition, this embodiment eliminates any exposure of the OTEC plant's condenser to seawater, eliminating the problem of seawater fouling of the condenser.

By freezing the heavy water and transporting it to the surface in fixed or movable vessels, no cold water is removed from the deep ocean or dumped near the ocean surface. The displacement of billions of tons of deep sea water, especially on a global scale if current OTEC becomes widespread, is predicted to have detrimental environmental effects because of localized thermal and salinity effects, as well as the potential to affect global circulation of deep currents. These detrimental effects are generally accepted in consideration of the benefits of OTEC as a clean energy source. However, by using frozen heavy water instead of displacing the deep water, the above-described harmful effects are eliminated almost entirely.

Another side effect of conventional OTEC is a downward influence on the surface temperature due to the large volume of wasted cold water, especially in an area of dense clusters of OTEC plants, which reduces the efficiency and output of the plants. Using frozen heavy water as described herein avoids this problem as well.

Only 10-15% of the relative temperature difference between the cold and warm water is used by the conventional OTEC process. This is evident in the temperature difference of 3.3° C. between the cold water entering and exiting the condenser in OTEC models. The other 85-90% pumped from the cold ocean depths is dumped as waste near the surface (after processing in the OTEC plant) at a temperature that is 16-25° C. cooler than the surface water (whose temperature is generally in the range 24-30° C.) resulting in the negative environmental effects as noted above. In contrast, the heavy water transport methods and systems described herein do not displace millions of tons of seawater every hour containing dissolved gasses and nutrients, but instead displace none at all transferring only thermal energy between the surface and the deep ocean with minimal environmental effects. Further, the heavy water transport methods and system described herein will utilize nearly 100% of the temperature difference between the frozen heavy water and the surface ocean water.

In a separate embodiment, instead of pumping warm water through a vessel, the surface water could be delivered to an OTEC plant by movement of the plant across the surface such that warm surface water is funneled inside for processing and then exits in a slightly cooler wake. In this way, the OTEC plant becomes a ship powered by the OTEC process. A network of localized UUVs can provide frozen heavy water for the OTEC process as the ship sails across the ocean surface. Since OTEC processes are generally scalable, UUVs of any size could be supported.

In addition to the advantages described above, the UUV-transported heavy water avoids other technical and economic challenges of conventional OTEC systems relying on pipe-based cold-ocean-water delivery. For example, the UUVs experience no static head loss, no friction losses from pumping through pipes, and avoid the energy cost associated with pumping tremendous volumes of water up from depths of 1000 meters or more. The use of UUVs avoids the construction challenges and expense associated with long pipes. The problem of outgassing of cold water as it nears the surface is avoided. The use of UUVs provides flexibility in placement of the OTEC plant whereas pipe-based, cold-water OTEC systems require the use of fixed-position platforms that, in turn, require the use and expense of deep mooring systems. The use of UUVs avoids the problems associated with surface water cooling brought on by cold water discharge inherent in current OTEC models. By avoiding all of the above-noted problems, heavy-water OTEC systems described herein offer the possibility of building OTEC platforms that could produce energy in excess of 400 megawatts, i.e., the generally accepted maximum production for current OTEC models.

Another advantage of using heavy water is the longer life and lower maintenance costs that will be experienced by the OTEC plant's condenser. Since the interior flow passages of the condenser will only be exposed to frozen heavy water and the OTEC plant's working fluid (e.g., ammonia, FREON, etc.), there is no exposure to seawater thereby eliminating seawater fouling. Elimination of seawater improves system efficiency, extends system life, and reduces system maintenance costs.

Generally accepted models for a 100 megawatt OTEC plant calculate a net increase in output of 13.6% for each 1° C. increase in the temperature difference between the warm and cold pools. This relationship creates an opportunity to increase plant output by decreasing the temperature of the frozen heavy water after its arrival at the ocean's surface thereby increasing the temperature difference. The low volume advantage and low specific heat of frozen heavy water together allow a relatively small amount of energy input to lower the temperature of the frozen heavy water in comparison to the large volume of warm water vapor or other working fluid vapor that will be cooled and condensed by the frozen heavy water. A heat pump could provide an efficient mechanism to lower the temperature of the frozen heavy water. After lowering the temperature of the frozen heavy water, high pressure must be applied in order to lower the frozen heavy water's melting temperature to match the low temperature achieved by the heat pump. The net result is an overall increase in the OTEC platform's net output from 50% to 300% or more. The level of increase depends on multiple factors, including:

the number of degrees the temperature of the ice is lowered, the efficiency of the heat pump, the efficiency of the process maintaining the pressure on the melting frozen heavy water, the efficiency of the process to recover energy expended for pressurization, e.g., when using a centrifuge, and the energy that can be recovered from the pressurized water remaining after melting is completed.

The above-described method also has a cost advantage since overall OTEC system costs can be reduced when increasing output because the required sizes of heat exchangers to achieve a given output level are reduced. Pump sizes are also reduced due to smaller volumes of warm water as well as smaller volumes of working fluid in the OTEC heat engine. Reducing sizes of these major components leads to lower costs.

Reducing the temperature of frozen heavy water below 0° C. is not supported in an open cycle OTEC plant because the water vapor would freeze at 0° C. on contact with the OTEC plant's condenser thereby reducing efficiency. This is not a limitation in closed cycle plants because working fluids with lower freezing temperatures can be used. The above-described approach expands the regions of the ocean that can support OTEC by increasing the temperature difference between the warm and cold pools utilized by the process, including mid and high-latitude regions that are unable to support current OTEC.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. An Ocean Thermal Energy Conversion (OTEC) system, comprising:
   a plurality of rigid containers, each of said rigid containers defining a sealed volume;
   heavy water disposed in a portion of each of said rigid containers;
   a vessel housing said rigid containers, said vessel adapted to be disposed in ocean water, said vessel comprising an unmanned underwater vehicle (UUV) for supporting transport of said rigid containers between a surface of the ocean water and a depth D of the ocean water at which said heavy water freezes to become frozen heavy water; and
   an OTEC plant located at the surface of the ocean water for melting said frozen heavy water contained within said rigid containers in a condensing process.

2. An OTEC system as in claim 1, wherein each of said rigid containers comprises a hollow plate, and wherein said rigid containers are spaced apart from one another within said UUV to comprise a heat exchanger.

3. An OTEC system as in claim 2, further comprising a plurality of hollow spheres in each said hollow plate, each of said hollow spheres filled with a combination of said heavy water and a compressible material.

4. An OTEC system as in claim 3, further comprising a non-freezing liquid disposed in each said hollow plate, wherein a combination of said non-freezing liquid and said hollow spheres comprises a slurry.

5. An OTEC system as in claim 3, wherein said compressible material comprises air.

6. An Ocean Thermal Energy Conversion (OTEC) system, comprising:

a plurality of rigid containers, each of said rigid containers defining a sealed volume partially filled with heavy water;

a vessel housing said rigid containers, said vessel adapted to be disposed in ocean water, said vessel transporting said rigid containers between a surface of the ocean water and a depth D of the ocean water at which said heavy water freezes to become frozen heavy water;

wherein each of said rigid containers comprises a hollow plate, and wherein said rigid containers are spaced apart from one another within said vessel to comprise a heat exchanger; and an OTEC plant located at the surface of the ocean water for melting said frozen heavy water in a condensing process.

7. An OTEC system as in claim 6, wherein said vessel is a movable vessel.

8. An OTEC system as in claim 6, further comprising:
a plurality of hollow spheres in each said hollow plate, each of said hollow spheres filled with a combination of said heavy water and a compressible material; and
a non-freezing liquid disposed in each said hollow plate, wherein a combination of said non-freezing liquid and said hollow spheres comprises a slurry.

9. A method of Ocean Thermal Energy Conversion (OTEC), comprising the steps of:
providing a plurality of rigid containers, each of said rigid containers defining a sealed volume;
providing heavy water in a portion of each of said rigid containers;
housing said rigid containers in a vessel comprising an unmanned underwater vehicle (UUV);
disposing said vessel in ocean water, said vessel supporting transport of said rigid containers between a surface of the ocean water and a depth D of the ocean water at which said heavy water freezes to become frozen heavy water;
providing an OTEC plant at the surface of the ocean water;
cycling said rigid containers in said vessel between said depth D and said OTEC plant; and
melting said frozen heavy water at said OTEC plant in a condensing process.

10. A method according to claim 9, wherein each of said rigid containers comprises a hollow plate, and wherein said rigid containers are spaced apart from one another within said UUV to comprise a heat exchanger.

11. A method according to claim 10, further comprising the step of disposing a plurality of hollow spheres in each said hollow plate, each of said hollow spheres filled with a combination of said heavy water and a compressible material.

12. A method according to claim 11, further comprising the step of disposing a non-freezing liquid in said each said hollow plate, wherein a combination of said non-freezing liquid and said hollow spheres comprises a slurry.

* * * * *